US010864745B2

(12) United States Patent
Higashiguchi et al.

(10) Patent No.: US 10,864,745 B2
(45) Date of Patent: Dec. 15, 2020

(54) LIQUID EJECTING APPARATUS AND CARTRIDGE

(71) Applicant: BROTHER KOGYO KABUSHIKI KAISHA, Nagoya (JP)

(72) Inventors: Daiki Higashiguchi, Tsu (JP); Isao Kubo, Tokoname (JP); Takahiko Watari, Nagoya (JP); Satoshi Yoshioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/541,291

(22) Filed: Aug. 15, 2019

(65) Prior Publication Data

US 2019/0366731 A1    Dec. 5, 2019

Related U.S. Application Data

(62) Division of application No. 15/786,663, filed on Oct. 18, 2017, now Pat. No. 10,427,415.

(30) Foreign Application Priority Data

Oct. 31, 2016  (JP) ................. 2016-212612

(51) Int. Cl.
  *B41J 2/175*    (2006.01)
  *G01F 23/26*    (2006.01)
  *B41J 29/38*    (2006.01)

(52) U.S. Cl.
  CPC .......... *B41J 2/17566* (2013.01); *B41J 2/175* (2013.01); *B41J 2/17509* (2013.01);
  (Continued)

(58) Field of Classification Search
  CPC .................................... B41J 2/17566
  See application file for complete search history.

(56) References Cited

U.S. PATENT DOCUMENTS 4,700,754 A    10/1987  Kringe
5,447,056 A    9/1995   Foote
(Continued)

FOREIGN PATENT DOCUMENTS

JP    10-034953 A     2/1998
JP    H10-109430 A    4/1998
(Continued)

OTHER PUBLICATIONS

Office Action dated Oct. 16, 2018 from parent U.S. Appl. No. 15/786,663.
(Continued)

*Primary Examiner* — Shelby L Fidler
(74) *Attorney, Agent, or Firm* — Scully, Scott, Murphy & Presser, PC (57) ABSTRACT

A liquid ejecting apparatus includes an ejection portion and a circuit. The ejection portion has a plurality of ejection ports configured to eject liquid supplied from a liquid storage portion defining a liquid storage space configured to store liquid. The circuit is electrically connected to at least one of a bottom electrode and a side electrode. The circuit is configured to detect a capacitance between the bottom electrode and the side electrode. The bottom electrode is provided at a bottom surface of the liquid storage portion. The side electrode is provided at one side surface of the liquid storage portion and electrically isolated from the bottom electrode.

4 Claims, 7 Drawing Sheets

(52) U.S. Cl.
CPC ........... *B41J 2/17526* (2013.01); *B41J 29/38* (2013.01); *G01F 23/263* (2013.01); *B41J 2002/17579* (2013.01)

(56) References Cited

U.S. PATENT DOCUMENTS

| | | | |
|---|---|---|---|
| 6,183,054 B1 * | 2/2001 | Froger | B41J 2/17566 347/7 |
| 6,352,325 B1 | 3/2002 | Truffaut et al. | |
| 6,474,156 B1 | 11/2002 | Endo et al. | |
| 6,598,963 B1 | 7/2003 | Yamamoto et al. | |
| 9,079,414 B2 | 7/2015 | Lester et al. | |
| 2001/0050695 A1 | 12/2001 | Moriyama et al. | |
| 2005/0280424 A1 * | 12/2005 | Qu | G01F 23/265 324/663 |
| 2007/0252715 A1 * | 11/2007 | Reddy | G01F 23/268 340/620 |
| 2008/0282795 A1 * | 11/2008 | Zabel | G01F 23/268 73/304 C |
| 2009/0040262 A1 | 2/2009 | Watanabe | |
| 2013/0293624 A1 | 11/2013 | Lester et al. | |

FOREIGN PATENT DOCUMENTS

| | | |
|---|---|---|
| JP | 2000-190457 A | 7/2000 |
| JP | 2000-263810 A | 9/2000 |
| JP | 2001063097 A | 3/2001 |
| JP | 2007030289 A | 2/2007 |
| JP | 2007-90558 A | 4/2007 |
| JP | 2008230227 A | 10/2008 |
| JP | 2011214904 A | 10/2011 |
| JP | 2013-176850 A | 9/2013 |
| WO | 2012/042901 A1 | 4/2012 |

OTHER PUBLICATIONS

Notice of Allowance dated May 16, 2019 from parent U.S. Appl. No. 15/786,663.

Official Action dated Sep. 15, 2020 received from the Japanese Patent Office in related application JP 2016-212612 together with English language translation.

\* cited by examiner

LIQUID EJECTING APPARATUS AND CARTRIDGE

CROSS REFERENCE TO RELATED APPLICATIONS

This application is a divisional application of U.S. Ser. No. 15/786,663 filed on Oct. 18, 2017 and claims priority from Japanese Patent Application No. 2016-212612 filed Oct. 31, 2016. The entire contents of the each of which are incorporated herein by reference.

TECHNICAL FIELD

This disclosure relates to a liquid ejecting apparatus which includes an ejection portion having a plurality of ports for ejecting liquid and a circuit for measuring a capacitance between electrodes. This disclosure also relates to a cartridge mountable on the liquid ejecting apparatus.

BACKGROUND

It is known to measure the remaining amount of ink in a cartridge by providing an electrode on each of a pair of side surfaces facing each other of a cartridge tank (i.e. a liquid storage portion), and then measuring a capacitance between the electrodes.

SUMMARY

According to one aspect, this specification discloses a liquid ejecting apparatus. The liquid ejecting apparatus includes an ejection portion and a circuit. The ejection portion has a plurality of ejection ports configured to eject liquid supplied from a liquid storage portion defining a liquid storage space configured to store liquid. The circuit is electrically connected to at least one of a bottom electrode and a side electrode. The circuit is configured to detect a capacitance between the bottom electrode and the side electrode. The bottom electrode is provided at a bottom surface of the liquid storage portion. The side electrode is provided at one side surface of the liquid storage portion and electrically isolated from the bottom electrode.

According to another aspect, this specification also discloses a cartridge configured to be mounted on a liquid ejecting apparatus including an ejection portion having a plurality of ejection ports configured to eject liquid and a circuit configured to detect a capacitance between electrodes. The cartridge includes a liquid storage portion, a bottom electrode, and a side electrode. The liquid storage portion defines a liquid storage space configured to store liquid supplied to the ejection portion. The bottom electrode is provided at a bottom surface of the liquid storage portion. The side electrode is provided at one side surface of the liquid storage portion and electrically isolated from the bottom electrode. When the cartridge is mounted on the liquid ejecting apparatus, at least one of the bottom electrode and the side electrode is electrically connected to the circuit, and a capacitance between the bottom electrode and the side electrode is detected by the circuit.

According to still another aspect, this specification also discloses a liquid ejecting apparatus. The liquid ejecting apparatus includes a liquid storage portion, an ejection portion, a bottom electrode, a side electrode, and a circuit. The liquid storage portion defines a liquid storage space configured to store liquid. The ejection portion has a plurality of ejection ports configured to eject liquid supplied from the liquid storage portion. The bottom electrode is provided at a bottom surface of the liquid storage portion. The side electrode is provided at one side surface of the liquid storage portion and electrically isolated from the bottom electrode. The circuit is electrically connected to at least one of the bottom electrode and the side electrode. The circuit is configured to detect a capacitance between the bottom electrode and the side electrode.

BRIEF DESCRIPTION OF THE DRAWINGS

Embodiments in accordance with this disclosure will be described in detail with reference to the following figures wherein.

DETAILED DESCRIPTION

When providing an electrode on each of a pair of side surfaces facing each other of the liquid storage portion as above, if the distance between the electrodes becomes shorter, the capacitance becomes larger. This results in improvement of detection accuracy of the remaining amount of ink. However, in order to secure the liquid storage space, there is a limit to improve accuracy of the remaining amount by shortening distance between the electrodes.

In addition, when providing an electrode on each of a pair of side surfaces facing each other of the liquid storage portion as above, the rate of change of the capacitance to the remaining amount is linear. In such a case, the detection accuracy of the remaining amount in a vicinity of the empty level cannot be improved.

In view of the foregoing, an example of an object of this disclosure is to provide a liquid ejecting apparatus and a cartridge which improve detection accuracy of the remaining amount of ink in the vicinity of the empty level.

Figure 1:
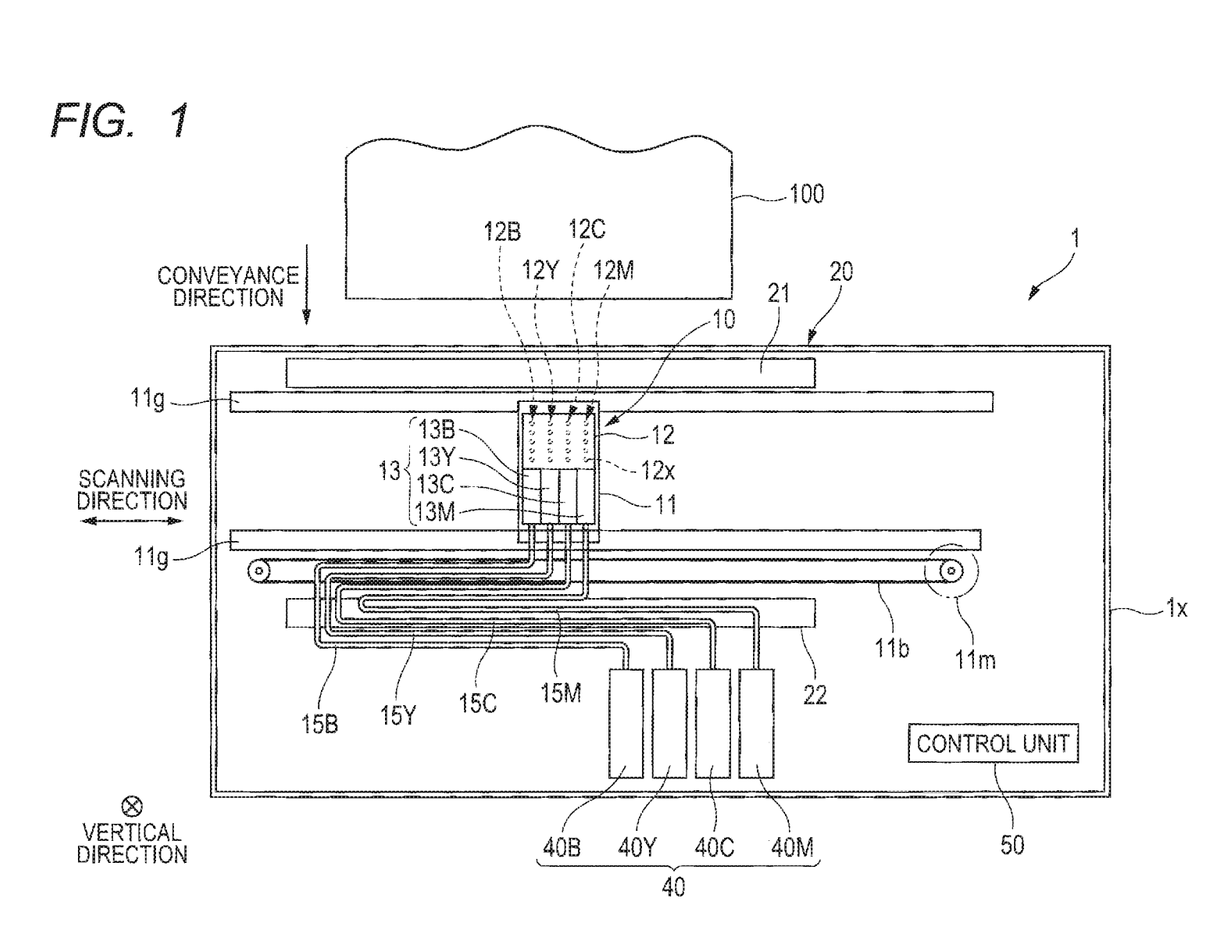
FIG. 1 is a plan view of a printer according to an embodiment.

An aspect of this disclosure will be described while referring to the accompanying drawings. As shown in FIG. 1, a printer 1 according to one embodiment of this disclosure has a housing 1x. Inside the housing 1x, there is provided an ejection unit 10, a conveyance unit 20, a cartridge unit 40, and a control unit 50.

The cartridge unit 40 includes four ink cartridges: 40B, 40Y, 40C, 40M, each containing black ink, yellow ink, cyan ink, and magenta ink. The four cartridges 40B, 40Y, 40C, 40M is individually detachably mounted on the housing 1x.

The ejection unit 10 includes a carriage 11, a head 12 and a sub-tank unit 13 respectively mounted on the carriage 11.

The carriage 11 is supported by two guide shafts 11g extending in the scanning direction. When the endless belt 11b travels with driving of a carriage motor 11m, the carriage 11 reciprocates in the scanning direction.

Figure 2:
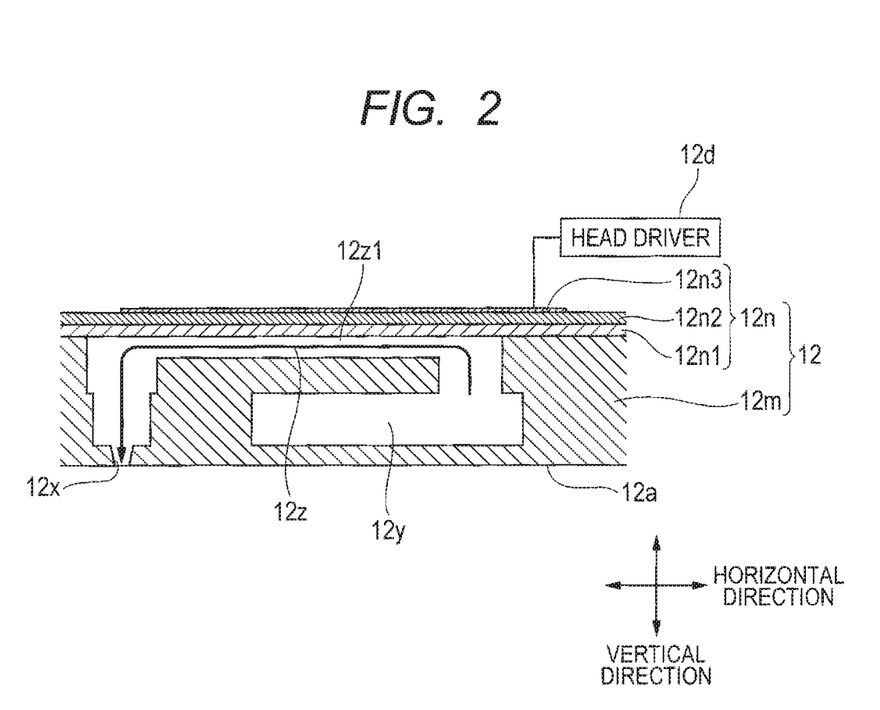
FIG. 2 is a cross-sectional view of a head of the printer according to the embodiment.

As shown in FIG. 2, the head 12 includes a channel unit 12m and an actuator unit 12n.

The lower surface of the channel unit 12m is an ejection surface 12a having a plurality of ejection ports 12x. As shown in FIG. 1, the ejection ports 12x form four rows of ejection ports 12B, 12Y, 12C, 12M in the conveyance direction. The four rows of ejection ports 12B, 12Y, 12C, 12M are arranged side by side in the scanning direction, each of these rows is formed by a plurality of ejection ports 12x ejecting single color ink of black, yellow, cyan, or magenta, respectively.

As shown in FIG. 2, the channel unit 12m includes a common channel 12y for each color of the rows of ejection ports 12B, 12Y, 12C, 12M and individual channels 12z for each of the ejection ports 12x. The individual channel 12z is a channel formed from an exit of the common channel 12y of a corresponding color to the ejection port 12x via a pressure chamber 12z1. There is a plurality of the pressure chambers 12z1 opening in the upper surface of the channel unit 12m.

The actuator unit 12n includes: a vibration plate 12n1 provided over the channel unit 12m to cover the plurality of pressure chamber 12z1, a piezoelectric layer 12n2 provided over the vibration plate 12n1, and a plurality of individual electrodes 12n3 provided over the piezoelectric layer 12n2 so as to face each of the pressure chamber 12z1. A part of the vibration plate 12n1 and the piezoelectric layer 12n2 in the area sandwiched between each individual electrode 12n3 and each pressure chamber 12z1 functions as an individual unimorph type actuator for each pressure chamber 12z1. This part is deformable in response to the voltage application by a head driver 12d to the individual electrode 12n3. When the actuator deforms to be convex toward the pressure chamber 12z1, the volume of the pressure chamber 12z1 decreases and the pressure within the pressure chamber 12z1 is applied to the ink therein, which results in ejection of ink from the ejection port 12x.

As shown in FIG. 1, the sub-tank unit 13 includes four sub-tanks 13B, 13Y, 13C, 13M, each stores black ink, yellow ink, cyan ink, and magenta ink. Each of the four sub-tanks 13B, 13Y, 13C, 13M is connected to each of the four cartridges of corresponding color 40B, 40Y, 40C, 40M through flexible tubes 15B, 15Y, 15C, 15M of corresponding color.

The four sub-tanks 13B, 13Y, 13C, 13M have the same configuration. The four cartridges 40B, 40Y, 40C, 40M have the same configuration.

Figure 3:
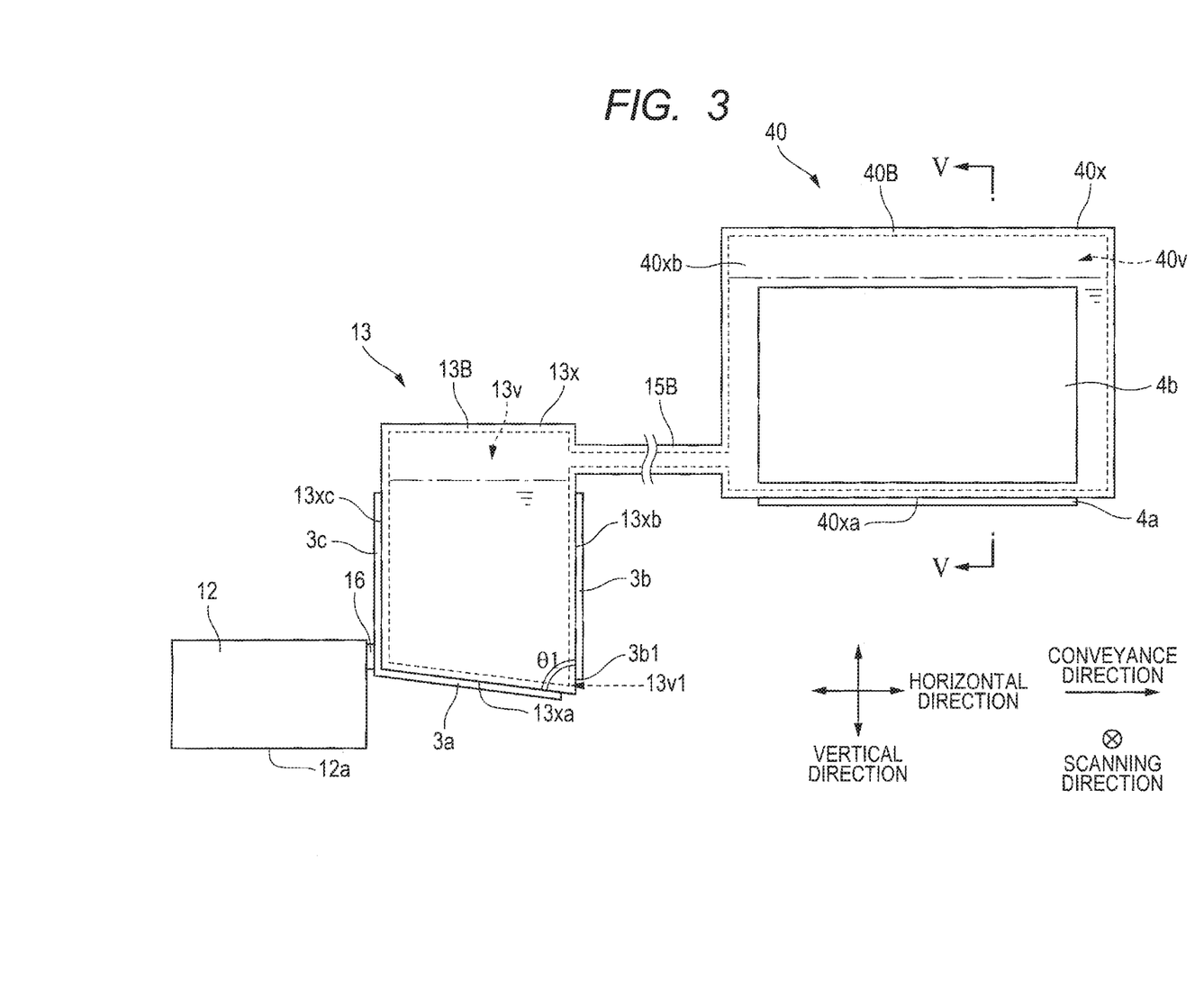
FIG. 3 is a side view of the head, a sub-tank, and a cartridge of the printer according to the embodiment.

As shown in FIG. 3, each of the sub-tanks 13B, 13Y, 13C, 13M has a housing 13x. Each of the cartridges 40B, 40Y, 40C, 40M also has a housing 40x. Each of these housings 13x, 40x is a substantially rectangular parallelepiped shape and defines an ink storage space 13v, 40v for storing ink therein.

The ink storage spaces 40v of the respective cartridges 40B, 40Y, 40C, 40M communicate with the ink storage spaces 13v of the sub-tanks 13B, 13Y, 13C, 13M of corresponding color through the tubes 15B, 15Y, 15C, 15M of corresponding color. The ink storage spaces 13v of the respective sub-tanks 13B, 13Y, 13C, 13M communicate with the common channels 12y of corresponding color in the head 12 through joints 16 of corresponding color.

The ink supplied from the ink storage space 40v of each cartridge 40B, 40Y, 40C, 40M to the ink storage space 13v of the sub-tank 13B, 13Y, 13C, 13M through the tube 15B, 15Y, 15C, 15M is temporarily stored in the ink storage spaces 13v and then supplied to the head 12 through the joint 16.

Figure 4:
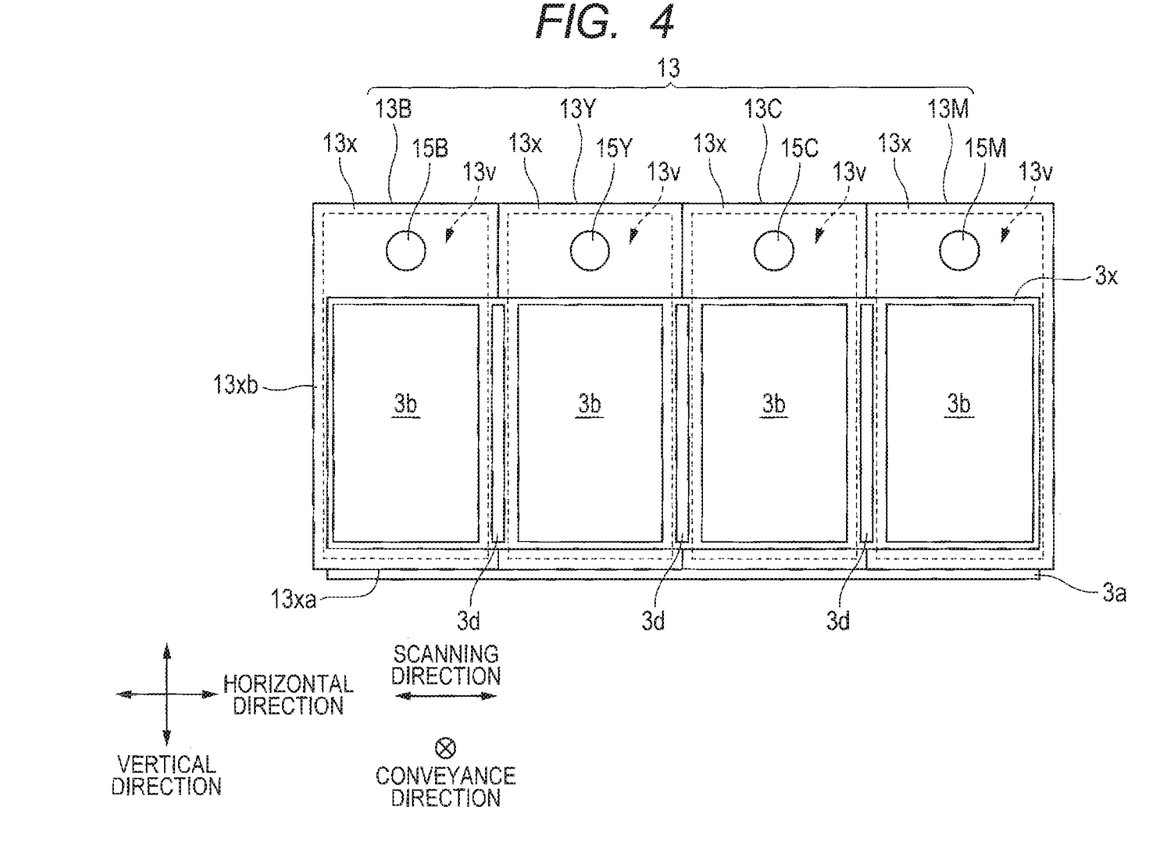
FIG. 4 is a side view of a sub-tank unit of the printer, as viewed from a downstream side in a conveyance direction, according to the embodiment.

As shown in FIG. 4, the housings 13x of the four sub-tanks 13B, 13Y, 13C, 13M are arranged in the scanning direction (a particular direction).

As shown in FIGS. 3 and 4, the sub-tank unit 13 is provided with a bottom electrode 3a, four side electrodes 3b, and four side electrodes 3c. Each side electrode 3b is not electrically connected to (that is, electrically isolated from) the bottom electrode 3a. In other word, there is no electrical conduction between each side electrode 3b and the bottom electrode 3a. Each side electrode 3c is electrically connected to the bottom electrode 3a, and is not electrically connected to the side electrode 3b. The bottom electrode 3a and the four side electrodes 3c are held at a ground potential.

The bottom electrode 3a is provided at a bottom surface 13xa of the housings 13x of the four sub-tanks 13B, 13Y, 13C, 13M. As shown in FIG. 4, the bottom electrode 3a extends in the scanning direction and is a common electrode for the four sub-tanks 13B, 13Y, 13C, 13M. The bottom electrode 3a faces substantially an entire region of the ink storage spaces 13v of the four sub-tanks 13B, 13Y, 13C, 13M in the vertical direction.

The four side electrodes 3b are arranged at intervals in the scanning direction on a board (substrate) 3x provided at a side surface 13xb of the housing 13x of the four sub-tanks 13B, 13Y, 13C, 13M. The four side electrodes 3b are individual electrodes for each of the four sub-tanks 13B, 13Y, 13C, 13M, and are electrically connected to a capacitance measurement circuit for sub-tank 13s (refer to FIG. 6). The four side electrodes 3b respectively faces, in the conveyance direction, the ink storage space 13v of the housing 13x of corresponding sub-tanks 13B, 13Y, 13C, 13M, but does not face, in the conveyance direction, the ink storage space 13v of the housing 13x adjacent to the corresponding housing 13x in the scanning direction. That is, each of the side electrodes 3b does not face the ink storage space 13v of the housing 13x adjacent to the housing 13x facing the corresponding side electrode 3b.

A ground electrode 3d is arranged between the two side electrodes 3b adjacent to each other in the scanning direction. Each ground electrode 3d extends in the vertical direction and is arranged in a vertical region substantially the same as that of the two side electrodes 3b sandwiching the ground electrode 3d in the scanning direction. In other words, each ground electrode 3d and the two side electrodes 3b sandwiching the ground electrode 3d in the scanning direction are substantially matching each other in the vertical direction.

In the housing 13x of sub-tanks 13B, 13Y, 13C, 13M, each of the four side electrodes 3c is provided at a side surface 13xc facing the side surface 13xb in the conveyance direction. The side electrodes 3c are arranged at intervals in the scanning direction in the same manner as the side electrodes 3b. The side electrode 3c faces the ink storage space 13v, in the conveyance direction, of one corresponding housing 13x out of the housings 13x of the four sub-tanks 13B, 13Y, 13C, 13M. The side electrode 3c does not face, in the conveyance direction, the ink storage spaces 13v of the housings 13x adjacent to the corresponding housing 13x in the scanning direction. The side electrode 3c and the side electrode 3b sandwich the corresponding ink storage space 13v in the conveyance direction.

As shown in FIG. 3, the side surface 13xb is parallel to the vertical and scanning directions. On the other hand, the bottom surface 13xa is slanted relative to the horizontal direction so as to be lower toward the downstream side in the conveyance direction, i.e. the direction from the side surface 13xc to the side surface 13xb. Due to this, an angle θ1 (theta 1) formed by the bottom surface 13xa and the side surface 13xb is an acute angle. An end portion of the bottom surface 13xa adjacent to the side surface 13xb (i.e. the right end of the bottom surface 13xa in FIG. 3) is slanted relative to the horizontal direction and forms an acute angle with the side surface 13xb.

In the same manner as above, the side electrode 3b is parallel to the vertical and scanning direction. On the other hand, the bottom electrode 3a is slanted relative to the horizontal direction so as to be lower toward the downstream side in the conveyance direction, i.e. the direction from the side electrode 3c to the side electrode 3b. An end portion of the bottom electrode 3a adjacent to the side electrode 3b (i.e. the right end of the bottom electrode 3a in FIG. 3) is provided at the above-mentioned end portion of the bottom surface 13xa. The end portion of the bottom electrode 3a forms an acute angle with a surface that is parallel to the side electrode 3b and that extends upward from the tip end of the end portion of the bottom electrode 3a.

A lower end 3b1 of each side electrode 3b is located at a higher position than a lower end 13v1 of the corresponding ink storage space 13v.

Figure 5:
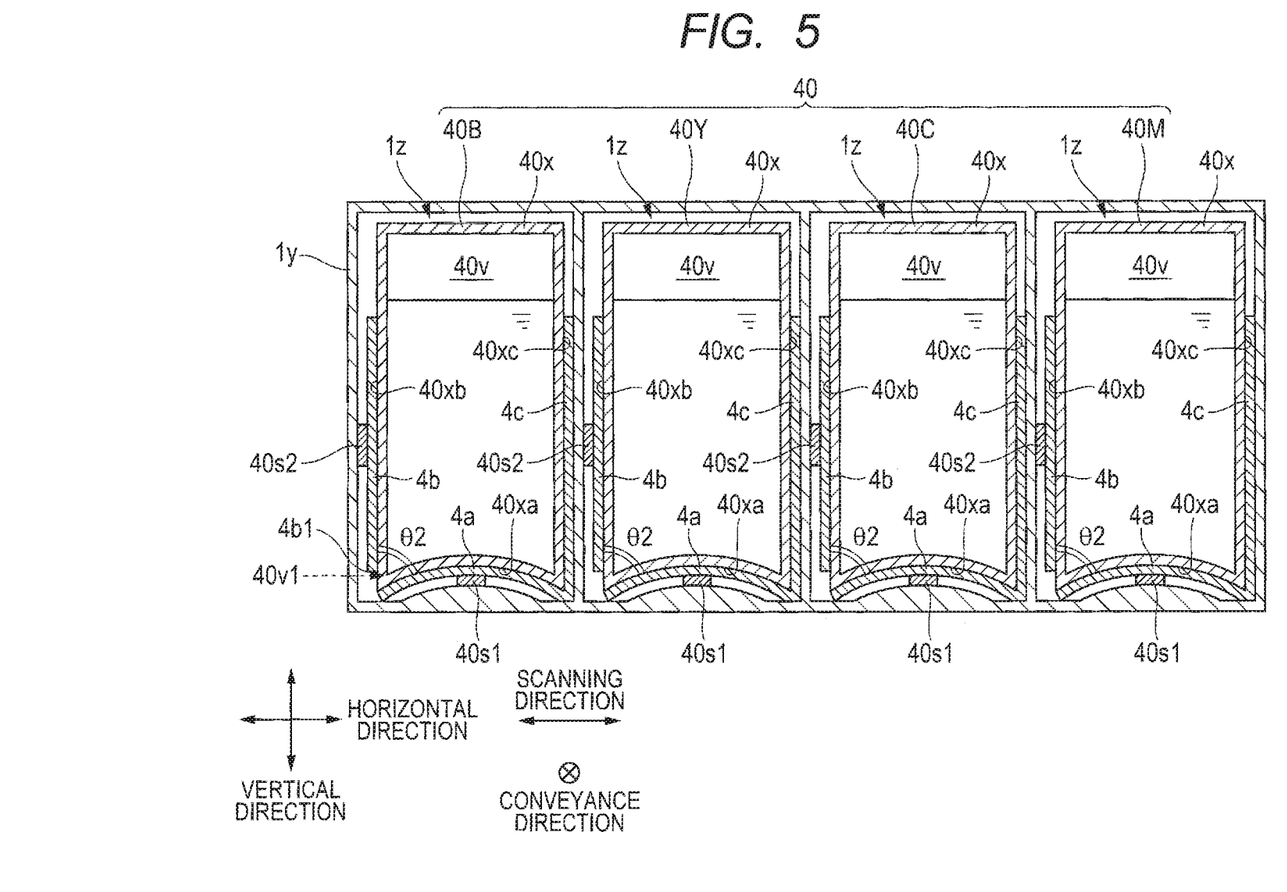
FIG. 5 is a cross-sectional view taken along line V-V of FIG. 3.

As shown in FIG. 5, the four cartridges 40B, 40Y, 40C, 40M are detachably mounted on respective ones of four storing chambers 1z provided in a cartridge holder 1y. The four storing chambers 1z are arranged in the scanning direction. Thus, when the four cartridges 40B, 40Y, 40C, 40M are mounted on the printer 1, the housings 40x of these cartridges are also arranged in the scanning direction.

As shown in FIGS. 3 and 5, each of the cartridges 40B, 40Y, 40C, 40M is provided with a bottom electrode 4a, a side electrode 4b, and a side electrode 4c. The bottom electrode 4a, the side electrode 4b, and the side electrode 4c are individual electrodes with respect to each cartridge 40B, 40Y, 40C, 40M. In each of the cartridges 40B, 40Y, 40C, 40M, the side electrode 4b is not electrically connected to the bottom electrode 4a. The side electrode 4c is electrically connected to the bottom electrode 4a, but is not electrically connected to (that is, electrically isolated from) the side electrode 4b.

The bottom electrode 4a is provided at a bottom surface 40xa of the housing 40x of each cartridge 40B, 40Y, 40C, 40M. The bottom electrode 4a faces substantially an entire region of the ink storage space 40v of the corresponding one of the cartridges 40B, 40Y, 40C, 40M.

The electrode 4b is provided at a side surface 40xb of the housing 40 of each cartridge 40B, 40Y, 40C, 40M.

In the housing 40x of each cartridge 40B, 40Y, 40C, 40M, the side electrode 4c is provided at a side surface 40xc facing the side surface 40xb in the scanning direction. The side electrodes 4b and 4c sandwich the corresponding ink storage space 40v in the scanning direction.

Terminals 40s1, 40s2 are provided at bottom and side walls which define each storing chamber 1z in the cartridge holder 1y. The terminal 40s1 is held at a ground potential and the terminal 40s2 is electrically connected to a capacitance measurement circuit for cartridge 40s (refer to FIG. 6.). When cartridges 40B, 40Y, 40C, 40M are mounted in the storing chamber 1z, the terminal 40s1 contacts the bottom electrodes 4a and the terminal 40s2 contacts the side electrode 4b, so that the bottom electrode 4a is held at a ground potential, and the side electrode 4b is electrically connected to a capacitance measurement circuit for cartridge 40s.

As shown in FIG. 5, the side surface 40xb is parallel to the vertical and conveyance directions, while the bottom surface 40xa is curved to be convex upward. Because of this, an angle θ2 (theta 2) formed by an end portion of the bottom surface 40xa adjacent to the side surface 40xb (i.e. the left end of the bottom surface 40xa in FIG. 5) and the side surface 40xb is an acute angle. In other words, the above-described end portion of the bottom surface 40xa is slanted relative to the horizontal direction and forms an acute angle with the side surface 40xb.

In the same manner as above, the side electrode 4b is parallel to the vertical and conveyance directions, while the bottom electrode 4a is curved to be convex upward. Because of this, an end portion in the bottom electrode 4a adjacent to the side electrode 4b (i.e. the left end in FIG. 5) is provided at the above-described end portion of the bottom surface 40xa and forms an acute angle with a surface that is parallel to the side electrode 4b and that extends upward from the tip end of the above-described end portion of the bottom electrode 4a.

A lower end 4b1 of the side electrode 4b is located at a higher position than a lower end 40v1 of the corresponding ink storage space 40v.

As shown in FIG. 1, the conveyance unit 20 conveys paper 100 in the conveyance direction. The conveyance unit 20 includes: a pair of conveyance rollers 21 arranged at the upstream side from the head 12 in the conveyance direction; and a pair of conveyance rollers 22 arranged at the downstream side from the head 12. The pair of conveyance rollers 21 and 22 respectively includes a driving roller and a driven roller which are arranged to nip the paper 100. When the driving roller rotates by a conveyance motor 20m (refer to FIG. 6), the driving roller and the driven roller rotate in opposite directions to each other.

An image is formed on the paper 100 conveyed by the conveyance unit 20 in the conveyance direction with the ink ejected from the ejection port 12x of the head 12 reciprocating in the scanning direction together with the carriage 11.

Figure 6:
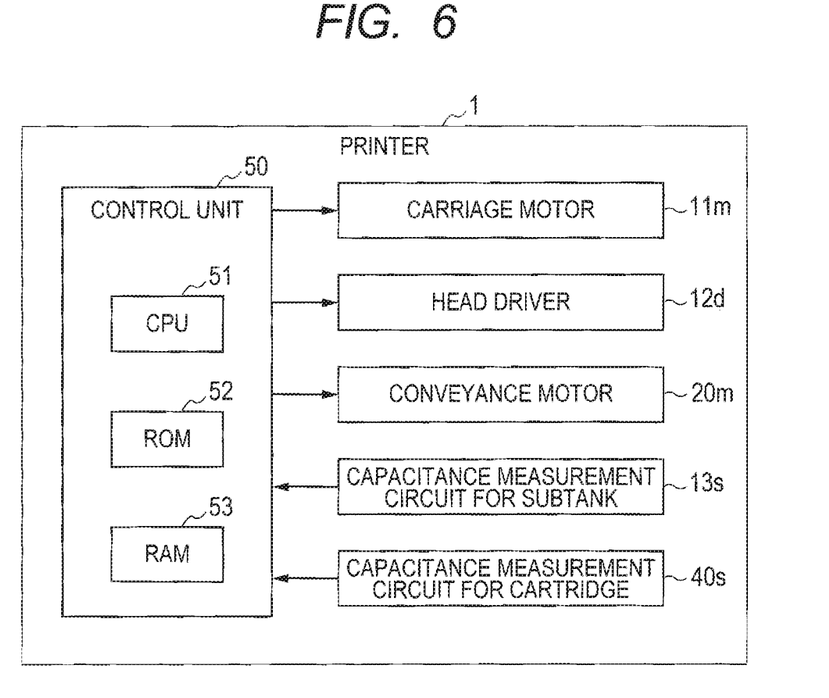
FIG. 6 is a block diagram showing an electric structure of the printer according to the embodiment.

The control unit 50 controls each part of the printer 1. As shown in FIG. 6, the control unit 50 includes a CPU (Central Processing Unit) 51, a ROM (Read Only Memory) 52, and a RAM (Random Access Memory) 53. The CPU 51 controls the carriage motor 11m, the head driver 12d, and the conveyance motor 20m, in order to record an image on the paper 100 based on an image data transmitted from an external device (for example, a PC connected to the printer 1). The ROM 52 stores programs to be executed by the CPU 51, various fixed data, and the like. The RAM 53 temporarily stores data necessary for the CPU 51 to execute programs, such as image data.

The capacitance measurement circuit for sub-tank 13s measures a capacitance between the bottom electrode 3a and each side electrode 3b. The capacitance measurement circuit for sub-tank 13s applies a sine wave to each of the side electrodes 3b and transmits signals indicating voltage according to the magnitude of the above-described capacitance to the control unit 50. The capacitance between the bottom electrode 3a and each of the side electrodes 3b varies depending on the remaining amount of ink in the sub-tank. The ROM 52 stores data showing correlation of the remaining amount of ink in the sub-tank and the capacitance between the bottom electrode 3a and each side electrode 3b (a first correlation). The CPU 51 determines the remaining amount of ink in each sub-tank 13B, 13Y, 13C, 13M based on data showing the first correlation stored in the ROM 52 and the signal received from the capacitance measurement circuit for sub-tank 13s, and executes suitable processing such as alarming for requesting exchange of the cartridges 40B, 40Y, 40C, 40M.

The capacitance measurement circuit for cartridge 40s measures a capacitance between the bottom electrode 4a and the side electrode 4b of each of the cartridges 40B, 40Y, 40C, 40M. The capacitance measurement circuit for cartridge 40s applies a sine wave to each of the side electrodes 4b through the terminal 40s2 and transmits signals indicating voltage according to the magnitude of the above-described capacitance to the control unit 50. The capacitance between the bottom electrode 4a and the side electrode 4b varies depending on the remaining amount of ink in the cartridges. The ROM 52 stores data showing correlation of the remaining amount of ink in the cartridge and the capacitance between the bottom electrode 4a and the side electrode 4b (a second correlation). The CPU 51 determines the remaining amount of ink in each cartridge based on the data of the second correlation and the signals received from the capacitance measurement circuit for cartridge 40s, and executes suitable processing such as alarming for requesting exchange of the cartridges 40B, 40Y, 40C, 40M.

As described above, according to the embodiment, in each sub-tank 13B, 13Y, 13C, 13M, the capacitance between the electrodes 3a and 3b is measured by providing an electrode (the bottom electrode 3a and the side electrode 3b) on each of the bottom surface 13xa and the side surface 13xb of the housing 13x, not by providing an electrode on each of a pair of side surfaces of the housing 13x facing each other. In addition, in each cartridge 40B, 40Y, 40C, 40M, the capacitance between these electrodes 4a and 4b is measured by providing an electrode (the bottom electrode 4a and the side electrode 4b) on the bottom surface 40xa and the side surface 40xb of the housing 40x (refer to FIG. 3), not by providing an electrode on each of a pair of side surfaces of the housing 40x facing each other. Thus, as shown in the below-described examples, as the rate of change of the capacitance to the remaining amount becomes larger in the vicinity of empty level, the detection accuracy of the remaining amount of ink can be improved.

In each sub-tank 13B, 13Y, 13C, 13M, an end portion in the bottom surface 13xa (i.e. the right end of the bottom surface 13xa in FIG. 3) adjacent to the side surface 13xb is slanted relative to the horizontal direction, and forms an acute angle with the side surface 13xb. The end portion of the bottom electrode 3a (i.e. the right end of the bottom electrode 13a in FIG. 3) adjacent to the side electrode 3b is provided at the above-described end portion of the bottom surface 13xa. The end portion of the bottom electrode 3a forms an acute angle with a surface that is parallel to the side electrode 3b and that extends upward from the tip end of the above-described end portion of the bottom electrode 3a. In each cartridge 40B, 40Y, 40C, 40M, an end portion of the bottom surface 40xa (i.e. the left end of the bottom surface 40xa) adjacent to the side surface 40xb is slanted relative to the horizontal direction and forms an acute angle with the side surface 40xb. The end portion of the bottom electrode 4a (i.e. the left end of the bottom electrode 4a in FIG. 5) adjacent to the side electrode 4b is provided at the above-described end portion of the bottom surface 40xb, and forms an acute angle with a surface that is parallel to the side electrode 4b and that extends upward from the tip end of the above-described end portion of the bottom electrode 4a. In this case, as shown in the below-described examples, the capacitance becomes larger in a region where the remaining amount is relatively large, compared with a case where a bottom surface is not slanted relative to the horizontal direction and a bottom electrode and a side electrode are perpendicular to each other. This suppresses enlarging the electrode for securing a capacitance required for detection of the remaining amount, and the electrodes and related components such as boards can be downsized. Moreover, as shown in the below-described example, the rate of change of the capacitance to the remaining amount becomes larger in the vicinity of empty level, compared with a case where a bottom surface is not slanted relative to the horizontal direction and a bottom electrode and a side electrode are perpendicular to each other. Thus, the detection accuracy of the remaining amount of ink can be improved.

In each sub-tank 13B, 13Y, 13C, 13M, the lower end 3b1 of the side electrode 3b is located above the lower end 13v1 of the corresponding ink storage space 13v (refer to FIG. 3). In each cartridge 40B, 40Y, 40C, 40M, the lower end 4b1 of the side electrode 4b is located above the lower end 40v1 of the corresponding ink storage space 40v (refer to FIG. 5). In this case, before the liquid level reaches the lower ends 13v1, 40v1 of the ink storage space 13v, 40v, in other words, before reaching the empty level, the capacitance rapidly approaches near zero at the phase when the liquid level reaches the lower ends 3b1, 4b1 of the side electrodes 3b, 4b. Accordingly, the detection accuracy of the remaining amount of ink can be improved in the vicinity of empty.

The housings 13x for the sub-tanks 13B, 13Y, 13C, 13M are arranged in the scanning direction (refer to FIG. 4). The bottom electrode 3a extends in the scanning direction (i.e. parallel to the arrangement of the four housings 13x), and the single bottom electrode 3a is a common electrode for the four housings 13x. The side electrode 3b is an individual electrode for each of the housings 13x. In this case, if either one of the bottom electrode 3a and the side electrode 3b extends along the arrangement direction of the four housings 13x, such a common electrode can be easily formed. In addition, the use of the common electrode makes wiring for each electrode unnecessary, thereby facilitating manufacturing of the sub-tanks 13B, 13Y, 13C, 13M and downsizing the components around the electrodes.

The four side electrodes 3b are arranged on a single board (substrate) 3x in the scanning direction (i.e. the arrangement direction of the four housings 13x) (refer to FIG. 4). This configuration suppresses complexity of wiring and facilitates the manufacturing, compared with the case of providing the individual electrode on an individual board.

Each of the four side electrodes 3b does not face the ink storage space 13v of the housing 13x adjacent to the housing corresponding to that side electrode 3b among the housings 13x of the four sub-tanks 13B, 13Y, 13C, 13M (refer to FIG. 4). Thus, in detecting the remaining amount of each sub-tank 13B, 13Y, 13C, 13M, a problem of being affected by an influence of the remaining amount of adjacent sub-tanks can be suppressed.

The ground electrode 3d is provided between the adjacent two side electrodes 3b, 3b (refer to FIG. 4). The ground electrode 3d suppresses an influence of the remaining amount of ink in the adjacent sub-tank during the detection of the remaining amount in each sub-tank 13B, 13Y, 13C, 13M.

In the sub-tank 13B, 13Y, 13C, 13M, another side electrode 3c which is electrically connected to the bottom electrode 3a but not electrically connected to the side electrode 3b is provided at one side surface 13xc, among the plurality of side surfaces of the housing 13x, facing the side surface 13xb on which the side electrode 3b is provided (refer to FIG. 3). In the cartridges 40B, 40Y, 40C, 40M, another side electrode 4c which is electrically connected to the bottom electrode 4a but not electrically connected to the side electrode 4b is provided at one side surface 40xc, among the plurality of side surfaces of the housing 40x, facing the side surface 40xb on which the side electrode 4b is provided (refer to FIG. 5). As shown in the below-described example, this increases the rate of change of the capacitance to the remaining amount of ink in the region having a relatively large remaining amount, thereby improving the detection accuracy of the remaining amount, compared with the case where the other side electrodes 3c and 4c are not provided.

Hereinafter, analysis results will be described with reference to FIGS. 7 and 8, regarding a relation between the remaining amount of ink and the capacitance in examples of this disclosure and comparative examples. The arrangement of electrodes in one liquid storage portion is different in each example.

In Example 1 of this disclosure, the bottom electrodes (i.e. the bottom electrodes 3a, 4a of the above embodiment) and the side electrodes (i.e. the side electrodes 3b, 4b of the above embodiment) are arranged on a rectangular parallelepiped liquid storage portion (i.e. having no slant or curve in the bottom and side surfaces), without providing the other side electrodes (i.e. the side electrodes 3c, 4c in the above-described embodiment).

In Example 2 of this disclosure, the bottom electrodes (i.e. the bottom electrodes 3a, 4a of the above embodiment), the side electrodes (i.e. the side electrodes 3b, 4b of the above embodiment), and the other side electrodes (i.e. the side electrodes 3c, 4c in the above-described embodiment) are arranged on a rectangular parallelepiped liquid storage portion (i.e. having no slant or curve in the bottom and side surfaces).

In Example 3 of this disclosure, the bottom electrode (i.e. the bottom electrode 3a of the above embodiment) and the side electrode (i.e. the side electrode 3b of the above embodiment) are arranged on a liquid storage portion having a slant in the bottom surface like the above-described sub-tank, without providing the other side electrode (i.e. the side electrode 3c in the above-described embodiment).

In Example 4 of this disclosure, the bottom electrode (i.e. the bottom electrode 4a of the above embodiment) and the side electrode (i.e. the side electrode 4b of the above embodiment) are arranged on a liquid storage portion having a curve in the bottom surface like the above-described cartridge, without providing the other side electrode (i.e. the side electrode 4c in the above-described embodiment).

In comparative example 1, an electrode is arranged on each of a pair of side surfaces facing each other in a rectangular parallelepiped liquid storage portion (i.e. having no slant or curve in the bottom and side surfaces).

In comparative example 2, two electrodes are arranged side by side in the horizontal direction on one side surface of a rectangular parallelepiped liquid storage portion (i.e. having no slant or curve in the bottom and side surfaces).

In comparative example 3, an electrode is arranged on each of two side surfaces connecting to each other (intersecting each other) in a rectangular parallelepiped liquid storage portion (having no slant or curve in the bottom and side surfaces).

Figure 7:
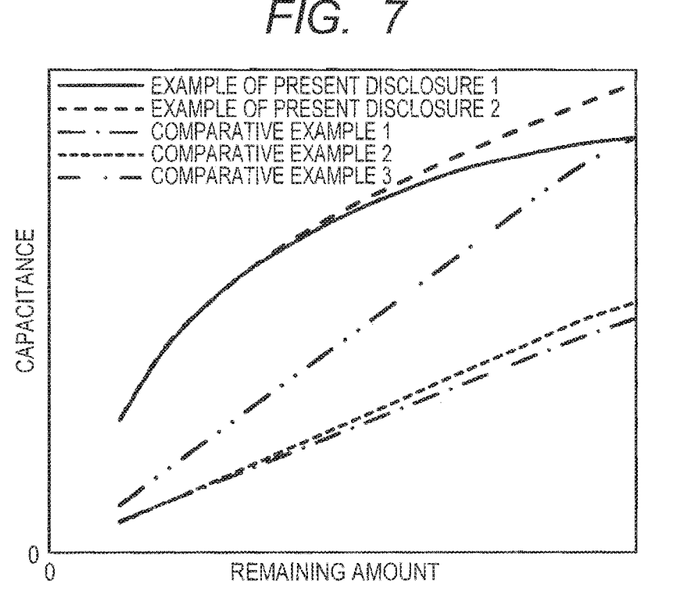
FIG. 7 is a graph showing a relation between a remaining amount and a capacitance of both of examples of this disclosure and comparative examples.

As shown in FIG. 7, the rate of change of the capacitance relative to the remaining amount in Comparative examples 1-3 increases proportionally, while the rate of change of the capacitance relative to the remaining amount in Examples 1 and 2 of this disclosure is larger in the vicinity of empty. Thus, it can be said that Examples 1 and 2 of this disclosure can improve the detection accuracy of the remaining amount in the vicinity of empty compared with Comparative examples 1-3.

FIG. 7 shows that Example 2 of this disclosure (i.e. the configuration having the other side electrode) has a larger rate of change of the capacitance relative to the remaining amount than that of Example 1 of this disclosure (i.e. the configuration without the other side electrode). Thus, it can be said that, when the other side electrode is provided, the detection accuracy of the remaining amount can be improved in the region having a relatively large remaining amount, compared with the configuration without the other side electrode.

Figure 8:
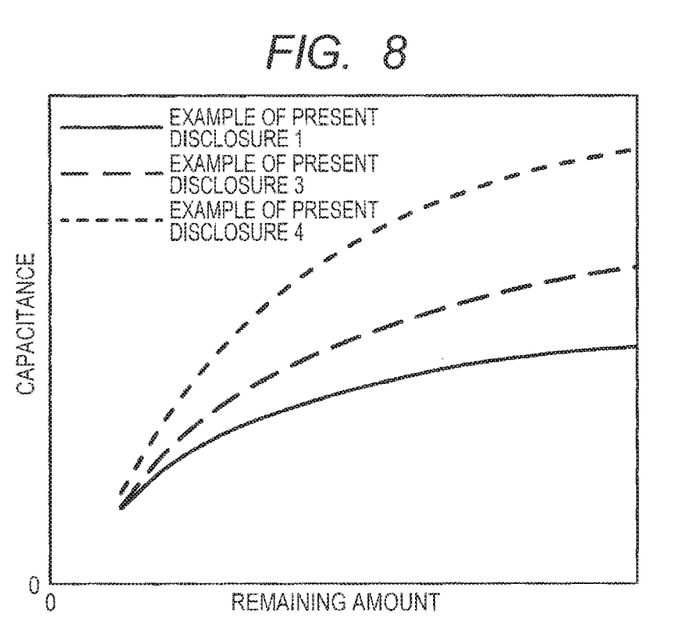
FIG. 8 is a graph showing a relation between a remaining amount and a capacitance of a plurality of examples of this disclosure.

FIG. 8 shows that Example 3 of this disclosure (i.e. the configuration having slant in the bottom surface) and Example 4 of this disclosure (i.e. the configuration having curve in the bottom surface) have a larger capacitance in the region of a relatively large remaining amount, and also have a larger rate of change of the capacitance relative to the remaining amount in the vicinity of empty, compared with Example 1 of this disclosure (i.e. the configuration without slant or curve in the bottom surface). Thus, it can be said that, according to Examples 3 and 4 of this disclosure (i.e. a configuration where an end portion of the bottom surface adjacent to one side surface having a side electrode thereon slants relative to the horizontal direction and forms an acute angle with the side surface; an end portion of the bottom electrode adjacent to the side electrode is provided at the above-described end portion of the bottom surface and forms an acute angle with a surface that is parallel to the side electrode and that extends upward from the tip end of the end portion of the bottom electrode), the capacitance is larger in a region having a relatively large remaining amount and the detection accuracy of the remaining amount can be improved in the vicinity of empty, compared with Example 1 of this disclosure (a configuration where the bottom surface is not slanted relative to the horizontal direction and the bottom electrode and the side electrode are perpendicular).

While the disclosure has been described in detail with reference to the above aspects thereof, it would be apparent to those skilled in the art that various changes and modifications may be made therein without departing from the scope of the claims.

The liquid storage portion provided in the liquid ejecting apparatus is not limited to an exchangeable tank (i.e. cartridge). The liquid storage portion may be a refillable tank to which liquid can be refilled.

The number of the liquid storage portions provided in the liquid ejecting apparatus may be any number of one or more. For example, four sub-tanks (or cartridges) are used as a set in the above-described embodiments. However, two sub-tanks (or cartridges) may be used as a set. Alternatively, only a single sub-tank and/or a single cartridge may be provided.

When a plurality of liquid storage portions is provided in the liquid ejecting apparatus, an electrode and a circuit of this disclosure may be provided to at least one of the plurality of the liquid storage portions.

The method for measuring the capacitance by using a circuit is not limited to the method described in the above embodiment. Any method (for example, a bridge method, a method using a resonance frequency, a method using a charging time constant, and a method using a flying capacitor) may be used.

The bottom surface may not be necessarily slanted relative to the horizontal direction, and the bottom electrode and the side electrode may be perpendicular to each other.

The lower end of the side electrode may be located at the same height as the lower end of the liquid storage space, or may be located at a lower position than the lower end of the liquid storage space.

The side electrode may be a common electrode, and the bottom electrode may be individual electrodes.

The plurality of individual electrodes may not be necessarily arranged on a single board.

The ground electrodes may not be necessarily provided between a plurality of individual electrodes.

The other side electrode may be omitted.

In the above-described embodiment, the bottom electrode and the side electrode are provided on the housing of the sub-tanks and the cartridges. Alternatively, the bottom electrode and the side electrode may be provided on surfaces (walls) of the liquid ejecting apparatus on which the sub-tanks and the cartridges are arranged. That is, the bottom electrode and the side electrode may be provided at the liquid ejecting apparatus.

For example, in FIG. 5, the bottom electrode 4a may be provided on at a bottom wall of the cartridge holder 1y and configured to face or contact the bottom surface 40xa of the cartridge 40 when the cartridge 40 is mounted on the cartridge holder 1y. Similarly, the side electrode 4b may be provided on at a side wall of the cartridge holder 1y and configured to face or contact the side surface 40xb of the cartridge 40 when the cartridge 40 is mounted on the cartridge holder 1y.

The liquid stored in the liquid storage portion is not limited to ink. The liquid may be any kind of liquid (for example, a processing liquid for agglutinating or precipitating components in ink).

This disclosure is applicable not only to a color printer but also to a monochromatic printer. This disclosure is applicable not only to a printer but also to a facsimile machine, a photocopier, a multi-function peripheral, and so on.

What is claimed is:

1. A cartridge configured to be mounted on a liquid ejecting apparatus including an ejection portion having a plurality of ejection ports configured to eject liquid and a circuit configured to detect a capacitance between electrodes, the cartridge comprising:
    a liquid storage portion defining a liquid storage space configured to store liquid supplied to the ejection portion;
    a bottom electrode provided at a bottom surface of the liquid storage portion; and
    a side electrode provided at one side surface of the liquid storage portion and electrically isolated from the bottom electrode,
    wherein when the cartridge is mounted on the liquid ejecting apparatus, at least one of the bottom electrode and the side electrode being electrically connected to the circuit, and a capacitance between the bottom electrode and the side electrode being detected by the circuit,
    wherein an end portion of the bottom electrode adjacent to the side electrode is provided at an end portion of the bottom surface, and forms an acute angle with a surface that is parallel to the side electrode and that extends upward from a tip end of the end portion of the bottom electrode.

2. The cartridge according to claim 1, wherein the end portion of the bottom surface is adjacent to the one side surface, is slanted relative to a horizontal direction and forms an acute angle with the one side surface.

3. The cartridge according to claim 1, wherein a lower end of the side electrode is located at a higher position than a lower end of the liquid storage space.

4. The cartridge according to claim 1, further comprising another side electrode provided at another side surface facing the one side surface among a plurality of side surfaces of the liquid storage portion, the another side electrode being electrically connected to the bottom electrode and electrically isolated from the side electrode.

* * * * *

UNITED STATES PATENT AND TRADEMARK OFFICE
CERTIFICATE OF CORRECTION

PATENT NO. : 10,864,745 B2
APPLICATION NO. : 16/541291
DATED : December 15, 2020
INVENTOR(S) : Daiki Higashiguchi et al.

Page 1 of 1

It is certified that error appears in the above-identified patent and that said Letters Patent is hereby corrected as shown below:

In the Claims

Column 12, Claim 1, Line 17 should read:
and the side electrode is electrically connected to Column 12, Claim 1, Line 19 should read:
electrode and the side electrode is detected by the Column 12, Claim 1, Line 20 should read:
circuit, and Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*